United States Patent [19]

Yamada et al.

[11] Patent Number: 4,512,010

[45] Date of Patent: Apr. 16, 1985

[54] APPARATUS FOR CONTROLLING LINEAR TRACKING ARM IN RECORD PLAYER

[75] Inventors: Jiro Yamada; Tetsuo Maeda, both of Neyagawa; Hiroshi Yasuda, Katano, all of Japan

[73] Assignee: Matsushita Electric Industrial Co., Ltd., Osaka, Japan

[21] Appl. No.: 423,267

[22] Filed: Sep. 24, 1982

[30] Foreign Application Priority Data

Sep. 28, 1981 [JP] Japan ............................. 56-154309
Sep. 30, 1981 [JP] Japan ............................. 56-156520
Sep. 30, 1981 [JP] Japan ............................. 56-156525

[51] Int. Cl.³ ............................................. G11B 3/10
[52] U.S. Cl. .................................... 369/220; 369/221; 369/230
[58] Field of Search .......................... 369/220, 221, 230

[56] References Cited

U.S. PATENT DOCUMENTS

| 4,185,836 | 1/1980 | Taylor et al. | 369/220 |
| 4,199,149 | 4/1980 | Ohsawa | 369/220 |
| 4,230,323 | 10/1980 | Tsuji et al. | 369/221 |
| 4,322,840 | 3/1982 | Kusaka | 369/220 |
| 4,342,108 | 7/1982 | Kitamura et al. | 369/230 |

Primary Examiner—Steven L. Stephan
Attorney, Agent, or Firm—Stevens, Davis, Miller & Mosher

[57] ABSTRACT

A control system for a linear tracking arm in a record player. A signal representative of a tracking error angle of the arm is, after A/D conversion, supplied to a microprocessor for producing a control signal which controls an arm drive device so that the tracking error angle constantly remains zero. For invalidating an offset quantity possibly produced in the output of a tracking error angle detecting sensor due to changes in the characteristic thereof, a signal produced by the sensor when the arm is lifted in precedence to the playback operation is stored in a memory of the microprocessor. During the playback, the tracking error angle is detected with reference to the stored value. An average moving speed of the arm is measured for discriminating transient increasing in the speed of the arm caused by eccentricity of the disc from the increasing of the speed caused by the arm entering a lead-out groove of the disc.

4 Claims, 9 Drawing Figures

APPARATUS FOR CONTROLLING LINEAR TRACKING ARM IN RECORD PLAYER

The present invention relates generally to an apparatus for controlling a linear tracking arm in a linear tracking type record player or the like. In particular, the present invention concerns a linear tracking arm control system in which a microcomputer is made use of for performing servo-control in such a manner that a tracking error angle remains constantly zero, with a simplified circuit arrangement which nevertheless assures stabilized servo-control characteristics.

The record player of a so-called linear tracking type in which a tone arm is linearly displaced in the direction radially of a record disc in playback operation has been increasingly used. In the record player of this type, it is desirable that a needle mounted at a free front end of the tone arm and an arm base adapted to support the tone arm at the rear end thereof are located on a line extending tangentially to a circular tone groove formed in the record disc. In practice, however, there often occur such situations that the needle is caused to follow the leading movement of the base arm sometimes with difficulty or inversely the arm base portion is caused to follow the tracking movement of the needle under the influence of frictional resistances between the needle and the record disc on one hand and between the arm base portion and a guide member therefor on the other hand. As the consequence, the tone arm is compelled to move with a certain angle to the tangential direction of the tone groove. This angle is referred to as the tracking error angle.

FIG. 1 of the accompanying drawings shows schematically a typical example of the hitherto known systems for controlling the tracking movement of the tone arm. Referring to the figure, a tracking error angle produced upon movement of the cartridge 1a mounted at the free front end of a tone arm 1 is detected by a sensor 2 and, after having been amplified through a differential amplifier 3, supplied to a motor drive circuit 5 by way of a filter 4 having an appropriate transfer function, whereby the arm base 7 is caused to move in the direction to cancel out the tracking error angle by a motor 6 which is driven by the motor drive circuit 5. A reference voltage $V_1$ applied to the reference input of the differential amplifier 3 is so adjusted as to be equal to the voltage derived from the output of the sensor 2 when the tracking error angle of the tone arm 1 is zero. The serve-control system mentioned above exhibits complicated mechanical resonance characteristics ascribable to the inherent mechanical arrangement and requires the filter circuit 4 imparted with correspondingly complicated filter characteristic in order to attain the stabilized servo-control characteristic. Consequently, implementation of this serve-control system by electronic components or circuitries will require a large number of circuit elements, involving high expenditure.

Further, it is noted that the output characteristic of the sensor 2 for detecting the tracking error angle undergoes variations as time elapses. In such case, the output of the sensor 2 produced when the tracking error angle is zero becomes different from the reference voltage $V_1$ applied to the reference input of the differential amplifier 3, resulting in that an offset error angle is produced to make it impossible or difficult to obtain the true tracking error angle, giving rise to another problem.

In the hitherto known linear tracking arm controlling system, there is provided a trace speed detecting circuit 9 for detecting that the tone arm has been moved to the end of the record groove. This circuit 9 serves to detect the tracing or tracking speed of the tone arm 1 and convert the latter into a corresponding voltage which is then supplied to a logic circuit 10 to be compared with a reference value set internally in the logic circuit 10. Describing in more detail in this connection, the tracing speed of the tone arm is relatively low so long as the needle point is tracing or tracking the tone groove. However, no sooner the needle point has entered a lead-out groove formed in the vicinity of the center of the record disc from the tone groove than the trace speed is steeply increased. When a voltage representing proportionately the trace speed of the tone arm as detected by the trace speed detecting circuit 9 becomes higher than a preset reference value, a return signal is produced for controlling the motor drive circuit 5 to lift and return the tone arm to the rest or starting position. In the case of the groove end detecting apparatus of the trace speed detection type in which the tracing speed is solely compared with the reference value, as mentioned above, there arises such a problem that the return signal may be produced to reset the tone arm to the rest position even in the cource of tracing the tone groove, when the tracing speed is instantaneously increased due to possible eccentricity of the record disc.

It is therefore an object of the present invention to provide a linear tracking arm control system in which the problems of the prior art systems are solved satisfactorily.

In view of the above and other objects which will be made more apparent as description proceeds, there is provided according to an aspect of the present invention a linear tracking arm control system in which the tracking error angle of a linear tracking arm is detected to produce a corresponding electric signal, which is then supplied to a microprocessor to derive a servo-control signal which can cancel out the tracking error angle. With such arrangement, a complicated transfer function inclusive of non-linear components can be easily realized by making use of inherent functions of the microprocessor such as arithmetic operation, storage capability, decision making function and the like, whereby stable servo-control characteristics can be attained.

According to another aspect of the present invention, there is provided a linear tracking arm control system in which the offset error angle of the linear tracking arm is previously written and stored in a memory incorporated in the microprocessor every time playback operation is to be effected, wherein the adjustment of the offset error angle is rendered unnecessary by comparing the angle value stored in the memory with the actual tracking error angle produced in the course of playback operation, while assuring insusceptibility to the influence of the offset error angle due to the changes in the characteristic of the sensor as possibly brought about as time elapses. With this arrangement, the offset error angle of the tone arm is newly set upon every playback operation to allow the preset offset error angle to be compared with the actual tracking error angle. Thus, the tone arm can trace the groove with the correct offset angle being maintained and without being subjected to the influence of the change in the sensor characteristic as brought about as a function of age, whereby the tracking or tracking performance of the tone arm is significantly improved, to an advantage.

According to a further aspect of the present invention, there is provided a linear tracking arm control system in which position detector means for converting the movement or instantaneous position of the arm into a series of position pulses to detect that the arm has been moved to the end position of a record disc, by counting the position pulses by means of a pulse counter for a predetermined time interval. When the contents or the pulse number of the pulse counter exceeds a preset reference value, the arm return signal is generated. With this arrangement, the return signal is produced on the basis of the average displacement of the arm, whereby the end position can be detected with an enhanced reliability without being likely returned to the rest position on the way under the influence of the eccentricity of the record disc, as is the case of the prior art control system.

The above and other objects, features and advantages will be better understood by reading the following description of preferred embodiments of the invention. The description makes reference to the accompanying drawings, in which.

Figure 2:
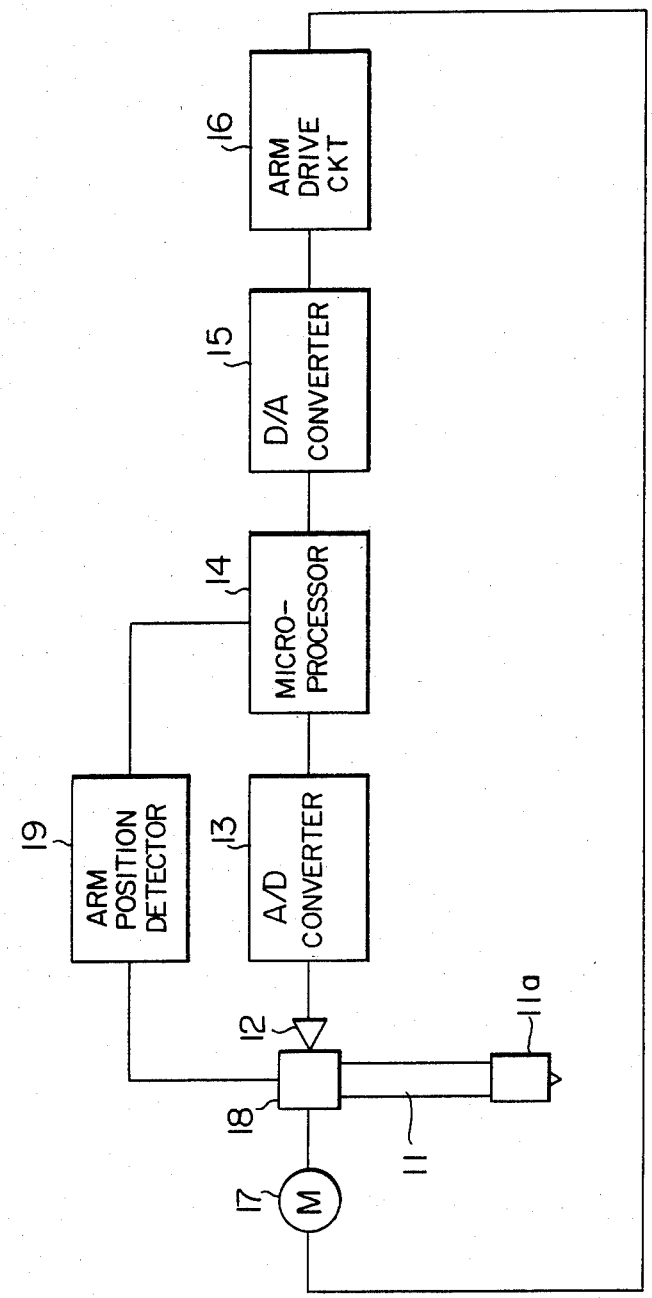
FIG. 2 shows in a block diagram a general arrangement of a linear tracking arm control system according to an embodiment of the present invention.

Referring to FIG. 2 which shows a linear tracking arm control system according to an embodiment of the present invention in which the transfer function of an arm servo-control loop is generated by a microprocessor, a tracking error angle produced as a cartridge 11a mounted on a tip end of a tone arm is moved is detected by a sensor 12 whose analogue output signal is converted into a corresponding digital signal by an analogue-to-digital or A/D converter 13 to be inputted to the microprocessor 14. The digital signal or data thus inputted is arithmetically processed by the microprocessor 14 to produce a driving pulse signal which is then converted into a corresponding analogue signal by a D/A converter 15 to be utilized for rotating a motor 17 through an arm drive circuit 16 for causing an arm base 18 to be displaced. The instantaneous position of the tone arm 11 is detected by an arm position detector 19. With the arrangement mentioned above, generation of a complicated transfer function inclusive of non-linear components can be much facilitated by making use of the available functions of the microprocessor 14 such as arithmetic operation, storage function and the decision making function. Further, the transfer function can be readily modified on the software base.

Describing in more detail in this connection, when a servo mechanism for controlling a given tone arm is constructed, the transfer function of the servo system can be previously made known through experiments. The transfer function exhibits extremely complicated non-linear characteristic ascribable to mechanical elements constituting parts of the servo-control mechanism. More specifically, when lead (or lag) of the tone arm with reference to the arm position at which the tracking error angle is zero is taken along the abscissa of a coordinate system while a servo-control output quantity required for cancelling the lead (or lag) quantity is taken along the ordinate, the relationship between the lead (or lag) and the servo output quantity presents an extremely complicated characteristic. In view of the above, it is taught by the present invention that the lead (or lag) quantity of the tone arm at a given instant is determined on the basis of pulse duration or width of the pulse signal supplied from the A/D converter 13 at that instant in accordance with a program stored in the microprocessor 14, and that the servo output quantity required for cancelling out the lead (or lag) is arithmetically determined on the basis of data stored in the memory of the microprocessor 14 to thereby produce at any instant the correct servo output quantity for cancelling out accurately the lead (or lag) of the tone arm.

A minute change of the transfer function can be finely regulated by modifying the program only a bit.

Figure 1:
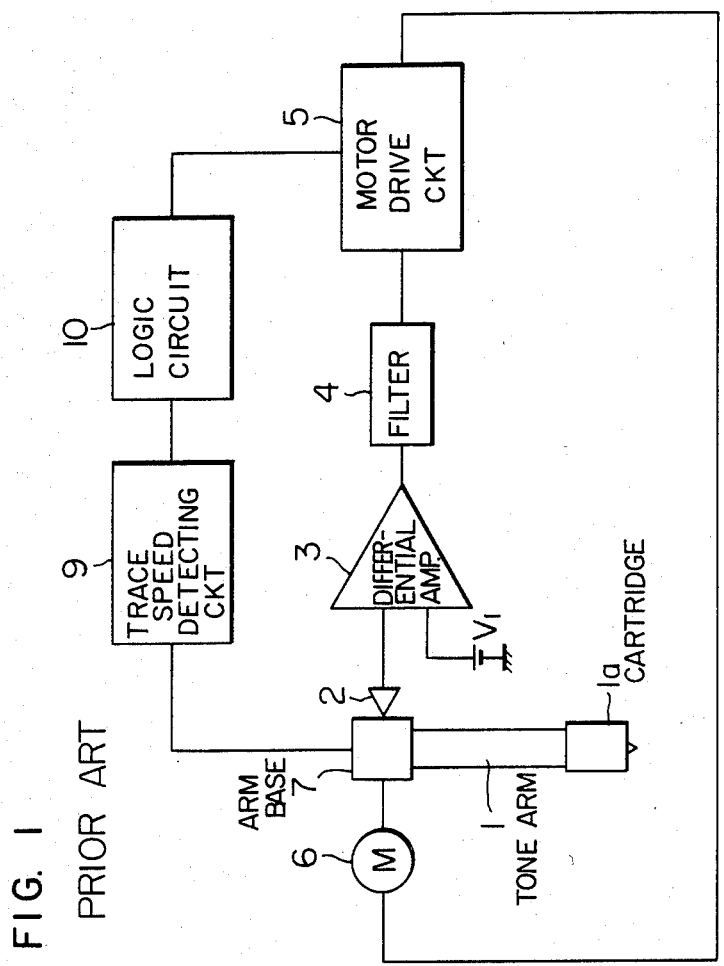
FIG. 1 shows in a block diagram a hitherto known control system for a linear tracking arm in a record player.
Figure 3:
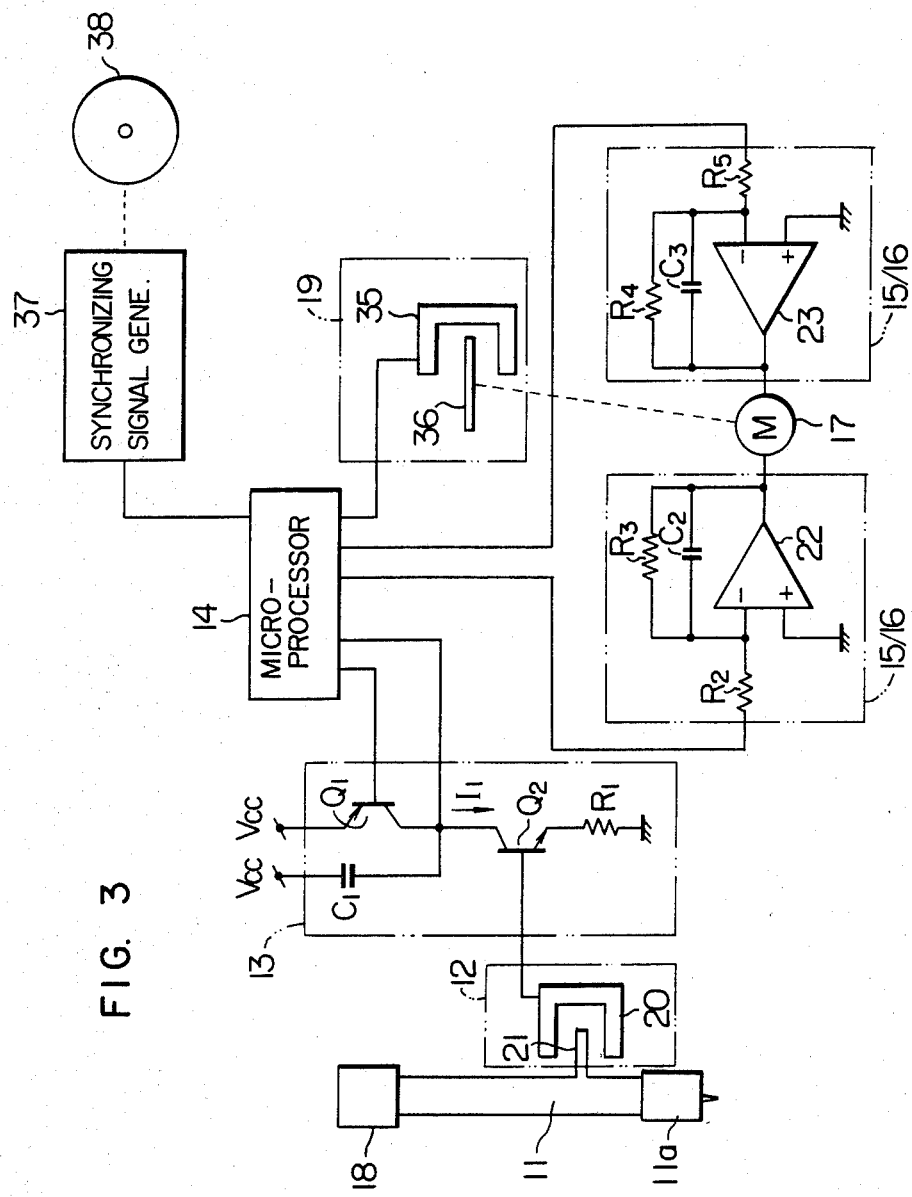
FIG. 3 shows in detail a circuit configuration of the linear tracking arm control system shown in FIG. 2.

FIG. 3 shows in more concrete a linear tracking arm control system according to a first embodiment of the invention. In this figure, parts or components having substantially same functions as those shown in FIGS. 1 and 2 are denoted by the like reference numerals. Further description of these parts will be unnecessary. The sensor 12 is composed of a photocoupler 20 constituted by a light emitting element and a light receiving element disposed in opposition to each other with a distance therebetween and a shutter member 21 swingable into the space defined between the paired elements of the photocoupler 20 in compliance with the swing movement of the tone arm 11. The A/D converter 13 is composed of transistors $Q_1$ and $Q_2$, a resistor $R_1$ and a capacitor $C_1$. Broken line blocks attached with the reference numerals 15/16 represent motor drive circuits composed of operational amplifiers 22 and 23, resistors $R_2$, $R_3$ and $R_4$, $R_5$ and capacitors $C_2$ and $C_3$, respectively. Each of the motor drive circuits exhibits a low pass characteristic and serves for the function which corresponds to those of the D/A converter 15 and the arm drive circuit 16 shown in FIG. 2.

With the arrangement described above and shown in FIG. 3, an analogue voltage produced by the sensor 12 in proportion to the tracking error angle defined hereinbefore is applied to the base of the transistor $Q_2$ to cause the collector current $I_1$ thereof to be varied. In this connection, it should be noted that when the transistor $Q_1$ is periodically turned on and off by a pulse signal produced from the microprocessor 14 to thereby charge and discharge the capacitor $C_1$ repetitionally, the tracking error angle can then be given in terms of a time taken for the collector potential of the transistor $Q_2$ to attain a predetermined reference voltage. In other words, there can be obtained from the collector of the transistor $Q_2$ a pulse signal of which width or duration varies in proportion to the tracking error angle. This pulse signal is supplied to the microprocessor 14 to be processed in accordance with a program stored in the microprocessor for producing the servo output signal which can cancel out the tracking error angle. The output signal from the microprocessor 14 is of course utilized for correspondingly controlling the motor 17 through the D/A converter/arm drive circuits 5/16, resulting in that the arm base 18 is displaced by the motor 17 to compensate the tracking error angle.

It will be appreciated that the control circuit can be realized inexpensively in a much simplified manner by using the A/D converter 13 which is capable of varying the pulse width of a pulse signal in accordance with the voltage signal representative of the tracking error angle, as is the case of the embodiment of the invention described above.

In the linear tracking arm control system described above, the tracking error angle of the linearly driven tone arm is detected to thereby produce a corresponding electric signal which is then supplied to the microprocessor to be so processed as to produce as the output of the microprocessor the servo output signal for compensating or cancelling out the tracking error angle. It will be appreciated that the complex transfer function inclusive of non-linear components can be easily realized by making use of the arithmetic function, storage function and the decision making function which are inherent to the microprocessor, whereby the stabilized servo characteristic can be attained.

Next, description will be made on an improvement of an initial characteristic deterioration brought about by the changes occurring in the characteristic of the sensor 12 as time elapses.

Figure 4:
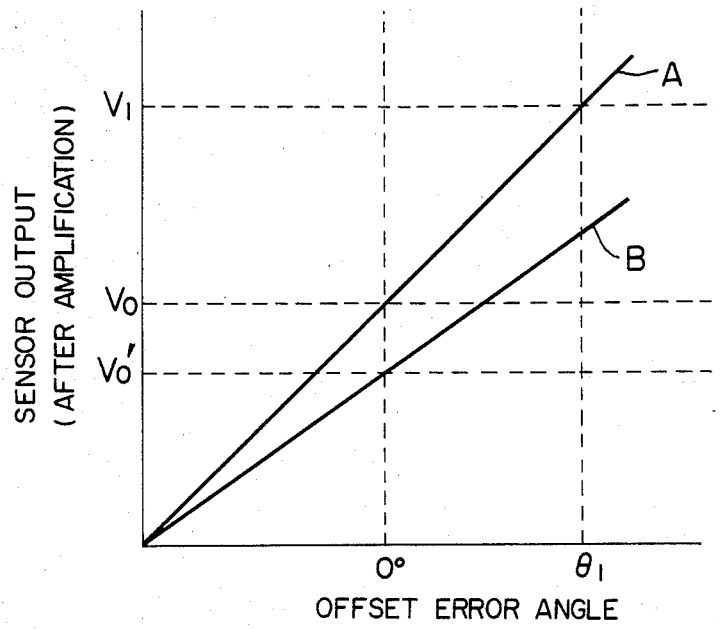
FIG. 4 is a view illustrating graphically a characteristic of a sensor as employed.

In general, in the linear tracking arm control system of this type, the output characteristic of the sensor 12 which can be originally represented by a curve A shown in FIG. 4 will be changed to the characteristic represented by a curve B shown in the same figure as a function of time lapse, whereby the sensor output voltage $V_o$ corresponding to the zero offset angle of the tone arm 11 is changed to a sensor output level $V_o'$. As the consequence, the sensor 11 produces the output signal ($V_o'$) even when the offset error angle of the tone arm is zero to thereby cause the tone arm to be displaced through the arm driving motor 17, resulting in that the so-called offset error angle is generated and this deteriorates the tracking performance of the tone arm 11.

Figure 5:
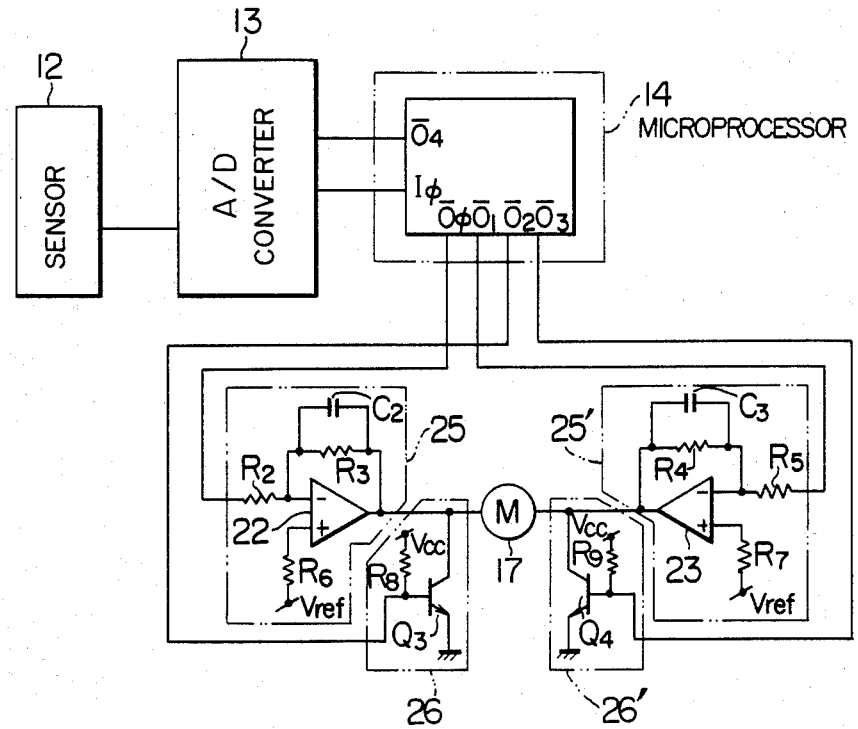
FIG. 5 is a circuit diagram of the linear tracking arm control system according to another embodiment of the invention.
Figure 6:
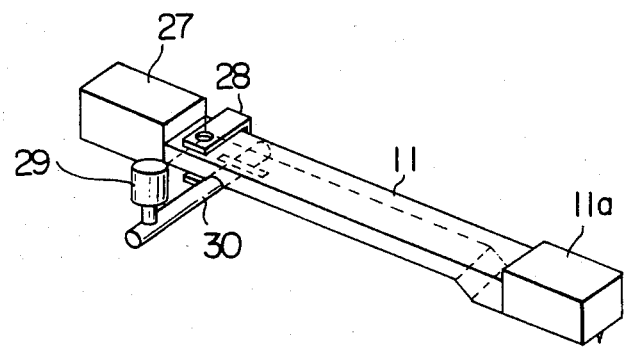
FIG. 6 shows in a perspective view a tone arm employed in the system shown in FIG. 5.
Figure 7:
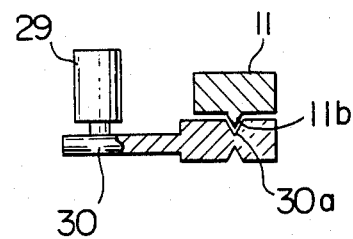
FIG. 7 is a cross-sectional view of the tone arm shown in FIG. 6.
Figure 8:
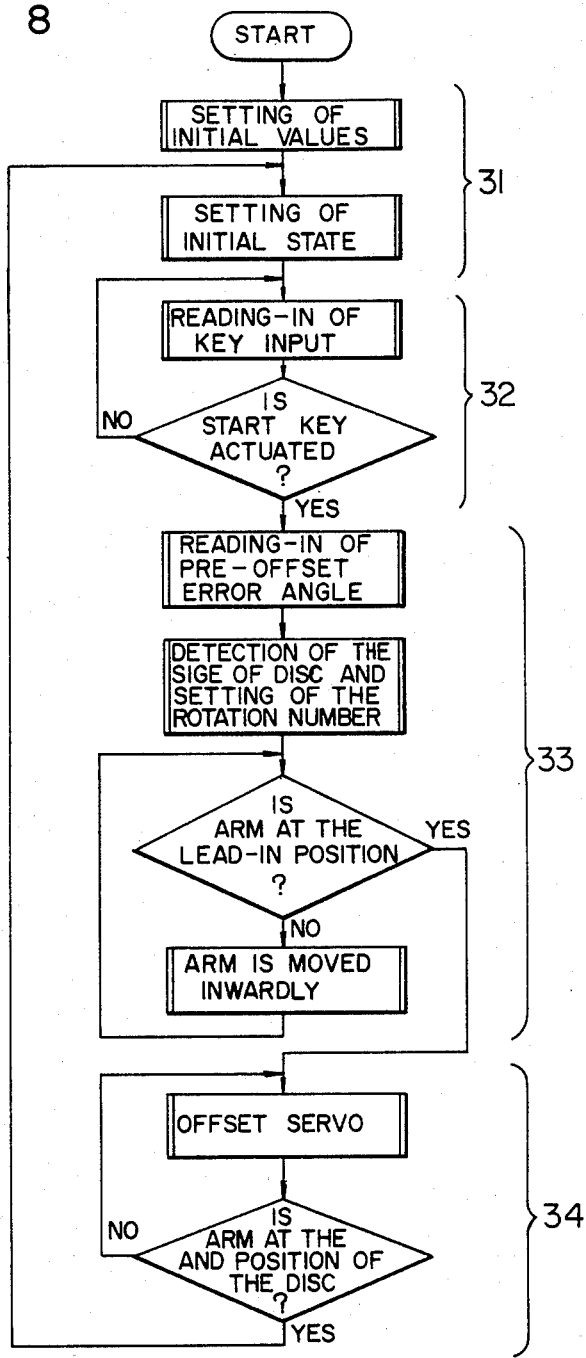
FIGS. 8 and 9 show flow charts to illustrate data processings executed by a microcomputer incorporated in the linear tracking arm control system according to the present invention.
Figure 9:
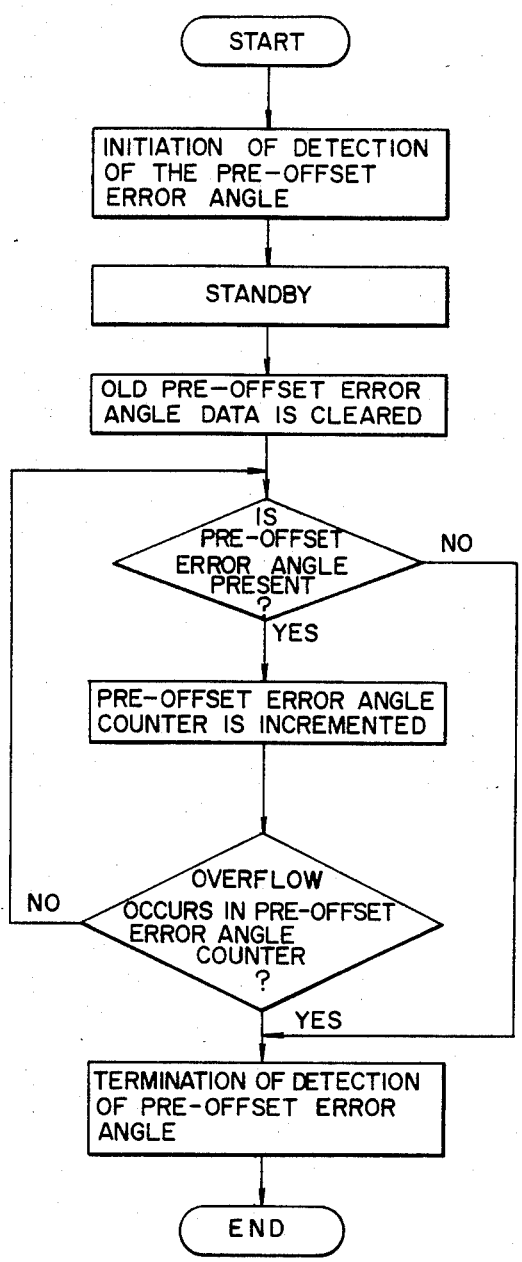

With a view to solving the above problem, it is taught according to another feature of the present invention to zero constantly the offset error angle regardless of changes in the output characteristic of the sensor 12 possibly brought about as time elapses with the aid of a structure shown in FIGS. 5 to 7 and the processings illustrated in flow charts of FIGS. 8 and 9.

Referring to FIG. 5 which shows a linear tracking arm control system according to another embodiment of the present invention, low pass filters each denoted by reference numerals 25 and 25' and having the substantially same construction as the circuits 15 and 16 shown in FIG. 3 are connected to output terminals $\overline{O_\phi}$ and $\overline{O_1}$, respectively, of the microprocessor 14 to linearize the offset error angle signals produced from these output terminals. Further, driver circuits denoted by reference numerals 26 and 26' and composed of transistors $Q_3$ and $Q_4$ and resistors $R_8$ and $R_9$, respectively, are connected to output terminals $\overline{O_2}$ and $\overline{O_3}$ of the microprocessor 14, respectively, so that the output signals making appearance at the output terminals $\overline{O_2}$ and $\overline{O_3}$ of the microprocessor 14 are applied to the bases of the transistors $Q_3$ and $Q_4$, respectively, to thereby control the driving voltage applied to the motor 17.

Referring to FIGS. 6 and 7, the tone arm 11 is provided with the cartridge 11a and a balancing weight 27 at the front and the rear end thereof, respectively, and is supported by an arm supporting mechanism 28 at an intermediate portion so as to be rotatable horizontally and vertically. The tone arm 11 is provided with a V-like projection 11b at the lower surface. The projection 11b is adapted to engage in a V-like groove 30a formed in an upper surface of a lift bar 20 which is adapted to be reciprocately moved by a cueing plunger 29.

The microprocessor 14 is adapted to execute a plurality of main routines illustrated in FIG. 8 and a subroutine illustrated in FIG. 9. Referring to FIG. 8, the main routines include an initializing main routine 31, a standby main routine 32, a start main routine 33 and a play main routine 34. In the initializing main routine 31, initial values are set in a random access memory of the microprocessor in response to the start command, which are followed by setting of initial states. In the standby main routine 32 which follows the initializing main routine 31, reading of data inputted by key operation is effected, and it is determined whether or not the start key is actuated. Unless the start key is actuated, the reading of the key input is again executed. On the other hand, when the start key is actuated, the execution proceeds to the start main routine, in which a pre-offset angle of the tone arm 11 upon lifting thereof which will be defined hereinafter is read in. Subsequently, the size of a record to be played are detected and the number of rotations is set. Next, it is determined whether or not the tone arm is in the lead-in position of the record. Unless the tone arm is in the lead-in position, the tone arm is displaced in the forward or inward direction and it is again checked whether or not the tone arm is at the lead-in position. This process is repeated until it is decided that the tone arm is at the lead-in position of the record. In the succeeding play main routine 34, the offset servo control is activated and it is determined whether or not the tone arm has come to the final position of the record. If the tone arm is not at the final end position of the record, activation of the offset servo control is continued. On the other hand, when it is detected that the tone arm is at the final end position, return is made to the initializing main routine 31 described above. On the other hand, in the subroutine illustrated in FIG. 9, detection of a pre-offset error angle is initiated in response to a start command. After lapse of a predetermined standby time, data of the pre-offset error angle employed in the preceding playing operation is cleared and a new pre-offset error angle is set. Subsequently, it is determined whether or not a pre-offset error angle is present or not. If the pre-offset error angle is absent, detection of the pre-offset error angle is terminated. Otherwise, data of the pre-offset error angle is loaded into the pre-offset error angle counter, which is followed by determination as to whether the contents of the pre-offset error angle counter has attained a predetermined value. If the result of the decision is negative, the process of loading the pre-offset error angle data into the pre-offset error angle counter is repeated until the pre-determined value has been attained.

In the linear tracking arm control systems described above, the microprocessor 14 includes a memory for storing the output value of the sensor 12. Data of the offset angle of the tone arm 11 corresponding to the zero offset angle of the tone arm, that is, the output value of the sensor 12 at the time when the tone arm 11 is lifted up with the V-like projection 116 of the tone arm engaging in the V-like groove 30a of the lift bar 30, is stored in the memory as the pre-offset angle data mentioned hereinbefore. In the course of the playback operation, the offset error angle of the tone arm is detected by the sensor 12 and converted into a corresponding voltage which is then converted into a corresponding time duration or a pulse having a corresponding width by means of the A/D converter 13, as described hereinbefore in conjunction with FIG. 3. The data of time duration thus obtained is inputted to the microprocessor 14 which arithmetically determines magnitude of the offset angle from the time duration data and outputs the corresponding digital signal. The digital signal is caused to pass through the low pass filter 25 to be converted into a corresponding DC voltage which is applied to the drive circuit 26 for driving the motor 17. The output of the sensor 12 corresponding to the zero offset error angle of the tone arm 11 (this output corresponds to the pre-offset error angle mentioned hereinbefore) is converted into a pulse signal having a corresponding time duration or pulse width by the A/D converter 13 and stored in the memory of the microprocessor 14. The storing operation of the pre-offset angle is always effected in precedence to the starting of the playback operation, whereby the old data used in the preceding playback operation is replaced by new data for the succeeding playback operation. When the record player is put into operation with the tone arm 11 tracing the tone groove, the output signal from the sensor 12 is converted into the pulse signal having a corresponding pulse duration by the A/D converter 13. The offset error angle data thus determined by the microprocessor on the basis of the pulse duration is compared with the pre-offset error angle data. When it is detected through the comparison that the tracking error angle is produced, the microprocessor 14 supplies an output signal to the filter 25 to control the arm driving motor 17 through the drive circuit 25 so that the tracking error angle becomes zero. In this way, by storing the pre-offset angle in the memory incorporated in the microprocessor 14, adjustment of the pre-offset error angle can be rendered unnecessary. In other words, the troublesome adjustment of the pre-offset angle which is required upon every playback operation in the hitherto known control system is made utterly unnecessary according to the present invention by storing the pre-offset error angle in the memory of the microprocessor 14. Further, since the pre-offset error angle is newly stored or updated in the memory of the processor 14 without fail in precedence to the playback operation to be compared with the actual error angle, the tracking performance of the tone arm will undergo no influence even when the voltage value representative of the pre-offset error angle is varied as brought about by the change in the characteristic of the sensor.

As will be appreciated from the above description, the adjustment of the pre-offset error angle is made unnecessary by virtue of the feature of the invention that the pre-offset error angle is previously stored and compared with the detected error angle in the course of the playback operation. Further, since the pre-offset error angle is always newly stored or updated in precedence to every playback operation, no degradation will occur in the tracing performance of the tone arm during the playback operation even if the output of the sensor should be changed due to deterioration of the sensor characteristic.

In the foregoing description, it has been assumed that the pre-offset error angle is stored in the memory of the microprocessor after the A/D conversion. However, it will be readily appreciated that the pre-offset error angle may be directly written in an analogue memory.

Next, referring to FIG. 3, description will be made about the function for detecting that the tone arm 11 has been moved to the final end position of the record. In FIG. 3, a reference numeral 35 denotes a photocoupler of the structure similar to that of the photocoupler 20 which includes a slit disc 36 adapted to be driven by the motor 17 so that at least the peripheral portion of the disc having a plurality of radial slits formed therein passes through a space defined between the light emitting element and the light receiving element of the photocoupler 35. An arm position detector 19 for detecting the instantaneous positon of the tone arm 11 (also refer to FIG. 2) in the form of the pulse signal is constituted by the photocoupler 35 and the slit disc 36. The pulse signal output from the tone arm position detector 19 is inputted to the microprocessor 14. Further provided is a synchronizing signal generator 37 which is adapted to generate a synchronizing signal in synchronism with rotation of a turntable 38. The synchronizing signal is also supplied to the microprocessor 14 to be utilized for determining the time taken for the turntable 38 to complete a single rotation. During a time interval corresponding to the single complete rotation of the turntable 38, the number of pulses produced by the arm positon detector 19 is counted to detect the speed at which the tone arm 11 is moved. When the speed exceeds a predetermined reference value, it is determined that the tone arm 11 has reached the final position of the record, whereupon the tone arm 11 is returned to the rest or starting position.

In this manner, the average moving speed of the tone arm 11 during the single complete rotation of the turntable 38 is measured, whereby erroneous decision of the turntable having reached the final end position of the record which might otherwise be made upon transient increasing of the moving speed of the tone arm as brought about by eccentricity of the disc or other causes to thereby return unintentionally the tone arm to the rest position can be positively excluded.

The determination of the average moving speed of the tone arm may be effected by counting the number of pulses produced during a predetermined period set by a timer rather than the period corresponding to the single rotation of the turntable 38.

We claim:

1. A control apparatus for a linear tracking arm in a record player, comprising:
   an arm having signal pick-up means mounted at a portion thereof;
   an arm base for supporting said arm;
   driving means for driving linearly said arm base to drive thereby said signal pick-up means in a radial direction of a rotating record disc;
   tracking error angle detecting means for detecting a tracking error angle of said arm to produce thereby an electric signal representing proportionately said tracking error angle;
   a microprocessor receiving said electric signal representing proportionately said tracking error angle for arithmetically determining on the basis of the electric signal a servo output signal which is supplied to said driving means for causing said tracking error angle to be constantly zero;

said electric signal comprising an electric voltage representing proportionately said tracking error angle, said voltage being an analogue voltage which is converted into a pulse signal having a pulse width proportional to said analogue voltage before inputting to said microprocessor, said microprocessor including a memory for storing therein said tracking error angle detected at a predetermined position of said arm, said arm being movable in the vertical direction; and a lift device which is detached from said arm when said arm is moved upwardly, said lift device being so arranged that said arm exhibits an offset angle of zero when said arm is moved upwardly, wherein said tracking error angle detected when said arm is moved upwardly is stored in the memory.

2. A control apparatus for a linear tracking arm in a record player, comprising:

an arm having signal pick-up means mounted at a portion thereof;

an arm base for supporting said arm;

driving means for driving linearly said arm base to drive thereby said signal pick-up means in a radial direction of a rotating record disc;

tracking error angle detecting means for detecting a tracking error angle of said arm to produce thereby an electric signal representing proportionately said tracking error angle;

a microprocessor receiving said electric signal representing proportionately said tracking error angle for arithmetically determining on the basis of the electric signal a servo output signal which is supplied to said driving means for causing said tracking error angle to be constantly zero;

arm position detecting means for detecting a position of said arm in terms of electric pulses;

pulse counting means for counting pulses produced by said position detecting means; and timer means for generating a reference time interval of a predetermined length, whereby the number of pulses produced by said position detecting means within said reference time interval in playback operation of said record player is counted to thereby determine an average displacement of said arm and said average displacement is then compared with a predetermined reference value for detecting that said arm has been moved to an end position of the disc.

3. A control apparatus for a linear tracking arm according to claim 2, wherein functions of said pulse counting means and said timer means are performed by said microprocessor.

4. A control apparatus for a linear tracking arm according to claim 2, wherein said timer means comprises by a synchronizing signal generator for generating a sychronizing signal in synchronism with rotation of a turntable, whereby said average displacement of said arm is determined by counting the number of the pulses produced by said arm position detecting means during a time taken for said turntable to complete a single rotation.

* * * * *